United States Patent
Chen et al.

(10) Patent No.: US 7,738,903 B2
(45) Date of Patent: Jun. 15, 2010

(54) TRANSMIT POWER INITIALIZATION FOR SECONDARY REVERSE LINK CARRIERS IN A WIRELESS COMMUNICATION NETWORK

(75) Inventors: Wanshi Chen, San Diego, CA (US); Anthony C. K. Soong, Superior, CO (US); Shiau-He Shawn Tsai, San Diego, CA (US); Rath Vannithamby, Portland, OR (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 991 days.

(21) Appl. No.: 11/372,575

(22) Filed: Mar. 10, 2006

(65) Prior Publication Data
US 2007/0042798 A1     Feb. 22, 2007

Related U.S. Application Data

(60) Provisional application No. 60/708,742, filed on Aug. 16, 2005.

(51) Int. Cl.
*H04B 7/00* (2006.01)
(52) U.S. Cl. .................. 455/522; 455/69; 455/13.4; 455/420; 370/318; 370/342
(58) Field of Classification Search .................. 455/522, 455/69, 13.4, 67.11, 7, 418, 420, 422.1, 574; 370/311, 318, 333, 335, 342
See application file for complete search history.

(56) References Cited

U.S. PATENT DOCUMENTS 6,173,162 B1 * 1/2001 Dahlman et al. .............. 455/69
6,567,670 B1 * 5/2003 Petersson ..................... 455/522
6,618,598 B1 * 9/2003 Gandhi et al. ................ 455/522
7,010,318 B2 * 3/2006 Chang et al. ................. 455/522
2003/0050084 A1 * 3/2003 Damnjanovic et al. ....... 455/522
2004/0193971 A1   9/2004 Soong et al.
2004/0252669 A1  12/2004 Hosein
2005/0009551 A1   1/2005 Tsai et al.

FOREIGN PATENT DOCUMENTS

EP         1061669       12/2000
EP         1195920        4/2002

OTHER PUBLICATIONS

Jianmin, L. and Chang, K.T., "Access Probe Power Setting Regarding RAB." 3GPP2 TSG-C. Aug. 2005. 6 pages.

* cited by examiner

*Primary Examiner*—Matthew D Anderson
*Assistant Examiner*—Shaima Q Aminzay
(74) *Attorney, Agent, or Firm*—Coats & Bennett, P.L.L.C.

(57) ABSTRACT

A method and apparatus provide for setting the initial transmit power of secondary reverse link carriers used by mobile stations in conjunction with primary reverse link carriers. In one or more embodiments, a mobile station sets the initial transmit power of a secondary reverse link carrier relative to the transmit power of the primary reverse link carrier as a function of initialization transmit power information transmitted to the mobile station, which directly or indirectly considers reverse link loading information. Additional considerations may include differences in active sets associated with the primary and secondary reverse link carriers and/or sector switching activity of the mobile station.

28 Claims, 3 Drawing Sheets

TRANSMIT POWER INITIALIZATION FOR SECONDARY REVERSE LINK CARRIERS IN A WIRELESS COMMUNICATION NETWORK

RELATED APPLICATIONS

This application claims priority under 35 U.S.C. §119(e) from the provisional U.S. patent application filed on 16 Aug. 2005 and assigned Ser. No. 60/708,742, which is expressly incorporated herein by reference.

BACKGROUND

The present invention generally relates to wireless communications, and particularly relates to initializing transmit powers for secondary reverse link carriers.

In some types of wireless communication networks, mobile stations are permitted to transmit reverse link data on two or more reverse link carriers, which may be referred to as one primary reverse link carrier and one or more secondary reverse link carriers. By way of non-limiting example, the 1x-EVDO standards currently in development include multi-carrier provisions that allow for primary and secondary reverse link carriers.

Controlling transmit power represents a fundamental challenge in CDMA-based networks and other interference-limited communication systems, and such control considerations extend to transmit power initialization. That is, while channel feedback may be used between transmitters and receivers for ongoing transmit power control, such feedback generally is unavailable at the outset of transmission.

The starting or initial transmit power of a primary reverse link carrier may be set by a mobile station based on access probing procedures. However, access probing is not performed once the primary reverse link carrier is established and therefore is not available for initializing the transmit power(s) of any secondary reverse link carrier(s) used by the mobile station.

One approach to initializing the transmit power of a secondary reverse link carrier is to set its initial transmit power to the current level of the primary reverse link carrier. However, to the extent that conditions for the secondary reverse link carrier differ from those for the primary reverse link carrier, this approach may result in initializing the secondary reverse link carrier transmit power either too high, or too low. Initializing the transmit power too low reduces connection success, while initializing the transmit power too high needlessly increases interference and wastes power at the mobile station.

SUMMARY

In one embodiment, a base station controller transmits initialization power offset information for use by mobile stations in setting the initial transmit power used by them for secondary reverse link carriers. Correspondingly, in one or more embodiments, a mobile station is configured to initialize secondary reverse link carrier transmit power based on the initialization power offset information.

With the above in mind, a method of initializing reverse link transmit power for secondary reverse link carriers in a wireless communication network comprises determining initialization power offset information for one or more secondary reverse link carriers as a function of reverse link loading, and transmitting the initialization power offset information to a mobile station for use in initializing secondary reverse link carrier transmit power.

Determining the initialization power offset information comprises, in one or more embodiments, determining reverse link loading differences relating at least one secondary reverse link carrier to a primary reverse link carrier associated with the mobile station. For example, determining the initialization power offset information may comprise determining at least one of reverse link loading differences relating one or more secondary reverse link carriers to a primary reverse link carrier, determining active set differences relating one or more secondary reverse link carriers to a primary reverse link carrier, and sector switching activity involving the mobile station.

In the above and other embodiments, the initialization power offset information may comprise explicit power offset information identifying at least one power offset to be used for initializing secondary reverse link transmit power relative to a current transmit power of a primary reverse link carrier associated with the mobile station. Alternatively, the initialization power offset information may comprise implicit power offset information indicating relative reverse link loading information for one or more secondary reverse link carriers and a primary reverse link carrier associated with the mobile station, such that the mobile station computes an initial power offset to be used for a secondary reverse link carrier as a function of the reverse link loading information.

Whether implicit or explicit information is transmitted, the initialization power offset information may be sent in a traffic channel assignment message. However, it should be understood that other mechanisms for providing initialization power information to mobile stations are contemplated herein. For example, in one embodiment, a base station controller, or a corresponding radio base station, is configured to transmit reverse link loading information, such as by transmitting reverse link activity indicators. Correspondingly, a mobile station is configured to use the reverse link loading information to determine initial transmit power offsets for one or more reverse link secondary carriers relative to a primary reverse link carrier.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
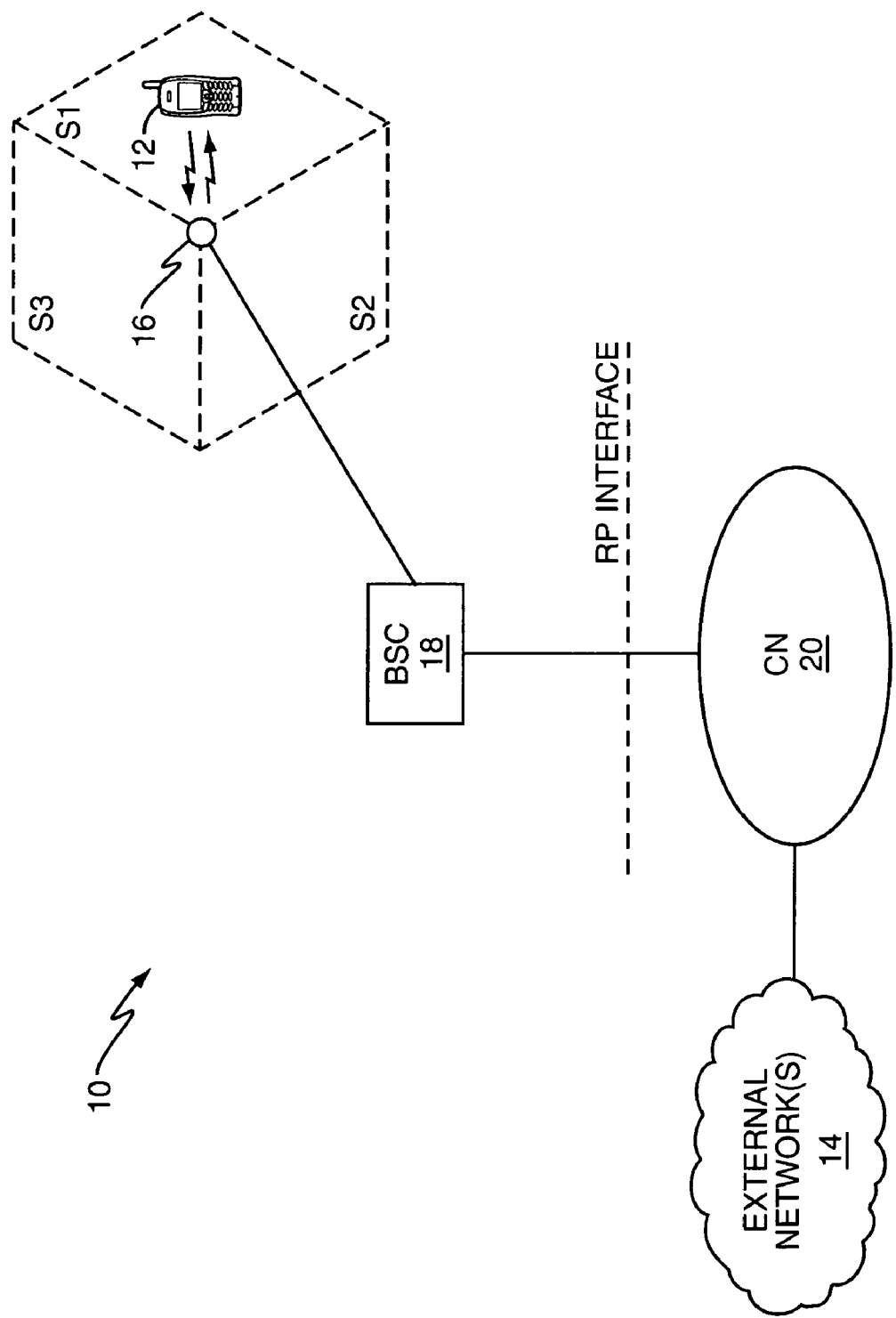
FIG. 1 is a block diagram of one embodiment of a wireless communication network configured according to transmit power initialization as taught herein.

FIG. 1 illustrates a wireless communication network 10 that is configured to support one or more embodiments of secondary reverse link carrier transmit power initialization as taught herein. By way of non-limiting example, the network 10 may be configured for CDMA-based packet data communications according to the 1×EVDO standards.

In operation, the network 10 communicatively couples mobile stations 12—one such terminal is illustrated for clarity—to one or more external data networks 14. Such networks may include the Internet or other public or private packet data networks. Supporting these communications, the illustrated network 10 comprises one or more radio base stations 16, and one or more base station controllers 18 to support the radio base stations 16. In turn, the network 10 further includes a core network (CN) 20, which may include Packet Data Serving Nodes, Authentication Servers, etc.

It should be understood that a single radio base station 16 and a single corresponding base station controller 18 are illustrated for clarity; additional ones of these elements may be present in an actual network, and other elements not illustrated herein may be present as well. It should be further understood that other base station system architectures may be used to support the secondary reverse link carrier transmit power initialization operations described herein. For example, an alternative architecture consolidates base station controller and radio transceiver resources into an integrated base station entity.

Figure 2:
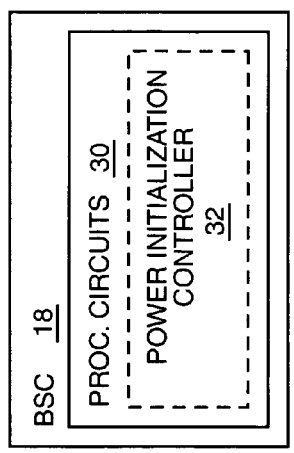
FIG. 2 is a block diagram of one embodiment of a base station controller that may be used in the network of FIG. 1.

As for the illustrated base station architecture, FIG. 2 functionally illustrates one embodiment of the base station controller 18 comprising one or more processing circuits 30, including a power initialization controller 32. These circuits may be implemented in hardware, software, or any combination thereof. For example, the base station controller 18 may include one or more general- or special-purpose microprocessor circuits and associated program and data memory, for carrying out communication processing. More particularly, a method and apparatus for implementing secondary reverse link carrier transmit power initialization may be implemented in the base station controller 18 by way of computer program instructions stored in a computer-readable medium, and one or more corresponding microprocessors, or other logic processing circuits, configured for execution of the computer program.

Figure 3:
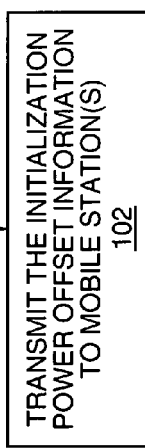
FIG. 3 is a logic flow diagram of one embodiment of processing logic for determining initialization power offset information used in setting initial transmit powers of secondary reverse link carrier(s) at a mobile station.

Regardless of the implementation details, FIG. 3 illustrates one embodiment of processing logic for initializing the transmit power of a secondary reverse link carrier. Processing begins with determining initialization power offset information (Step 100), and continues with transmitting the initialization power offset information to a mobile station 12—e.g., transmitting the information through a radio base station 16 having the mobile station's current forward link serving sector.

The base station controller 18 may consider one or more data items in determining the initialization power offset information. For example, the base station controller 18 can aggregate reverse link load information for active sets of all of the involved reverse link carriers, i.e., a primary reverse link carrier and one or more secondary reverse link carriers that are candidates for use by the mobile station 12. The base station controller 18 then computes appropriate initial transmit power offsets for the secondary carriers relative to the primary carrier. (According to a non-limiting definition used herein, the term "carrier" represents a logically or physically distinct communication channel. There may be one carrier per sector of a sectorized radio base station 16—i.e., a carrier in each of sectors S1, S2, and S3—or there may be multiple carriers in one sector, such as different carriers of different frequencies. Further, multiple carriers may be defined using different spreading codes.)

With the above in mind, the action of determining the initialization power offset information (Step 100) comprises, in one or more embodiments, determining reverse link loading differences relating at least one secondary reverse link carrier to a primary reverse link carrier associated with the mobile station. As such, the initial transmit power of a secondary reverse link carrier at the mobile station 12 can be set in consideration of reverse link loading. In at least one embodiment, such consideration is based on loading differences. More particularly, determining the initialization power offset information comprises determining at least one of reverse link loading differences relating one or more secondary reverse link carriers to a primary reverse link carrier.

With this method, the mobile station 12 can be controlled, or otherwise configured, to initialize transmit power for a secondary carrier at a level above a current transmit power of the mobile station's primary reverse link carrier, if the reverse link loading associated with the secondary reverse link carrier is higher than that associated with the primary reverse link carrier. Conversely, the mobile station 12 can be controlled, or otherwise configured, to initialize transmit power for a secondary carrier at a level below the current transmit power of the mobile station's primary reverse link carrier, if the reverse link loading associated with the secondary carrier is lower than that associated with the primary reverse link carrier.

By way of non-limiting example, the base station controller 18 may be configured to receive sector-specific and/or carrier-specific reverse link loading estimates from the radio base stations 16 operating under its control. As a non-limiting example, loading information may be conveyed in the form of reverse activity bits (RABs). In turn, the radio base stations 16 may be configured to generate loading estimates for delivery to the base station controller 18 on a periodic basis or on an as-needed basis. In one embodiment, reverse link loading estimates are determined as a function of Rise-over-Thermal (RoT) measurements. In such embodiments, the network 10 may be configured to use "silence periods" wherein transmission activity is suspended periodically to provide quiet moments for more accurately measuring RoT at the radio receivers of the radio base stations 16. (Of course, it should be understood that other methods of measuring reverse link loading may be used, such as by tracking aggregate data throughputs, or by tracking the number of type of users being supported by the network 10. Further, load tracking may be done on a per-sector and/or per-carrier basis.)

However it is determined, the initialization power offset information may be transmitted to a particular mobile station 12, or to groups of mobile stations 12, such as commonly to all mobile stations 12 operating in a given radio base station sector. In one embodiment, the initialization power offset information is transmitted as explicit offset information, i.e., computed offset values that can be used by the mobile stations 12 in setting the relative power levels initially used for their secondary reverse link carriers. In another embodiment, the initialization power offset information is transmitted in the form of sector loading information, such that the mobile stations 12 can compute offset values from the received information. In other words, the initialization power offset information can comprise pre-computed offset values, or can comprise information relevant to the mobile stations' computations of offset values.

With the above examples in mind, it will be broadly understood that one or more embodiments of a base station controller 18 as taught herein include one or more processing circuits configured to determine initialization power offset information for one or more secondary reverse link carriers as a function of reverse link loading, and transmit the initialization power offset information to a mobile station for use in initializing secondary reverse link carrier transmit power. The information may be determined by determining reverse link loading differences relating at least one secondary reverse link carrier to a primary reverse link carrier associated with the mobile station.

As noted, the (initialization power offset) information may comprise explicit power offset information identifying at least one power offset to be used for initializing secondary reverse link transmit power relative to a current transmit power of a primary reverse link carrier associated with the mobile station 12. Alternatively, the information may comprise implicit power offset information indicating relative reverse link loading information for one or more secondary reverse link carriers and a primary reverse link carrier associated with the mobile station, such that the mobile station 12 computes an initial power offset to be used for a secondary reverse link carrier as a function of the reverse link loading information. In either case, the base station controller 18 may be configured to transmit the initialization power offset information by transmitting the power offset information in a traffic channel assignment message. Generally, it should be understood that the power offset information can be sent in essentially any type of broadcast and/or unicast message type, and that the particular type(s) of messages used to send such information may change according to network type, or for other reasons as needed or desired.

In at least one embodiment, the base station controller 18 is configured to further determine the initialization power offset information as a function of differences in active set sizes associated with one or more secondary reverse link carriers and a primary reverse link carrier associated with the mobile station 12. More generally, the base station controller can be configured to determine the initialization power offset information by determining at least one of reverse link loading differences relating one or more secondary reverse link carriers to a primary reverse link carrier, determining active set differences relating one or more secondary reverse link carriers to a primary reverse link carrier, and sector switching activity involving the mobile station.

For example, if the active set of radio base station sectors associated with the primary reverse link carrier is smaller than the active set associated with a given secondary reverse link carrier that is a candidate for use by the mobile station 12, the initial transmit power offset set by the mobile station 12 may be made smaller than it would be if active set size differences were not considered. The reduction corresponds to the presumed diversity gain advantages associated with the larger active set size of the secondary reverse link carrier.

Figure 4:
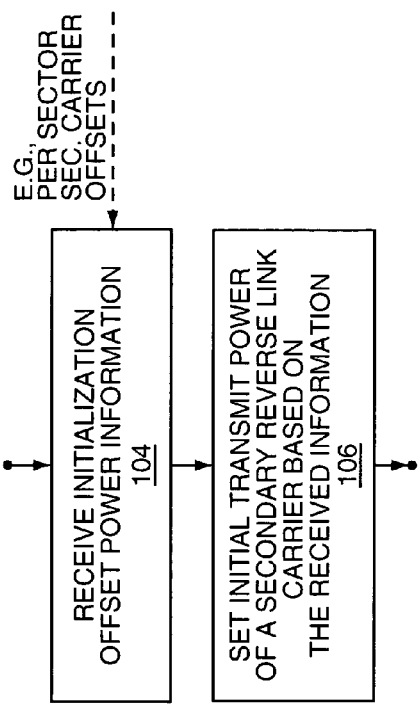
FIG. 4 is a logic flow diagram of one embodiment of processing logic for mobile station reverse link transmit power initialization

With the above possibilities for different information types that may be considered when setting the initial transmit power of a secondary reverse link carrier relative to a primary reverse link carrier, FIG. 4 illustrates one embodiment of mobile station processing logic that complements the transmission of the initialization power offset information. Processing "begins" with the mobile station 12 receiving the initialization offset power information (Step 104). As noted earlier, the received information may comprise computed offsets or the underlying information to be used by the mobile station 12 in computing the appropriate offsets. Mobile station processing continues with setting the initial transmit power of a secondary reverse link carrier based on the received information (Step 106).

Notably, in the context of FIG. 4 and in other embodiments, the base stations 16 and/or the base station controllers 18 may be configured to send per-sector transmit power offset information for the secondary carriers, rather than per-mobile offset information. Thus, the mobile station 12 may be configured such that it chooses the offset(s) defined for the sector which is the current serving sector. If the mobile station 12 performs a sector switch before the initial reverse link acquisition is complete on the secondary carrier—that is, inner loop power control by the network has not yet started—the processing circuit(s) in the mobile station 12 update the initial offset to be used for secondary carrier transmit power based on the offset corresponding to the new serving sector.

Figure 5:
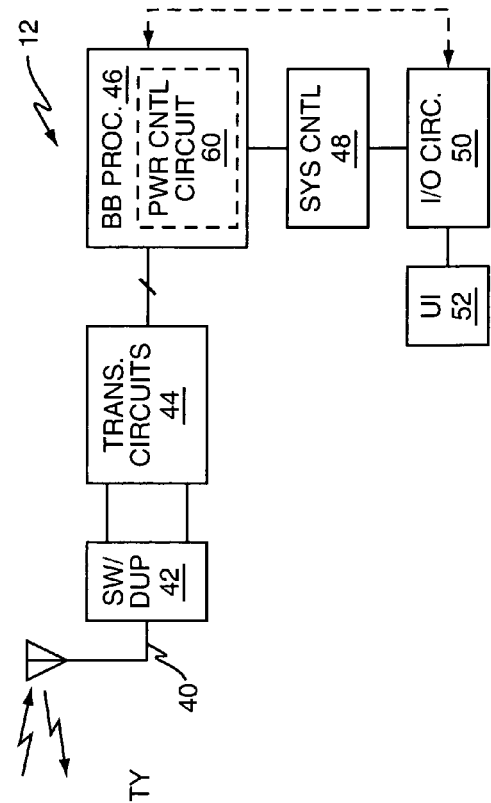
FIG. 5 is a block diagram of one embodiment of a mobile station that is configured to carry out transmit power initialization as taught herein.

FIG. 5 illustrates an embodiment of the mobile station 12 that is configured to carry out the processing logic of FIG. 4, or variations of that logic. The illustrated mobile station 12 comprises a transmit/receive antenna 40, a switch/duplexer 42, a transceiver circuit 44, such as a CDMA-based radiofrequency transceiver circuit, a baseband processor circuit 46, a system controller 48, input/output (I/O) circuits 50, and a user interface 52. It will be understood that some elements may be added, deleted, or altered with respect to the diagram, depending upon the intended use of the mobile station 12. On that point, the term "mobile station" as used herein should be given broad construction. Non-limiting examples of mobile stations include cellular handsets or other types of access terminal, pagers, Portable Digital Assistants (PDAs), palmtop or laptop computers, or communication modules therein.

Of particular interest regarding the mobile station's functional illustration, one sees that the baseband processor circuit 46, which actually may comprise multiple microprocessor and/or other digital logic circuits, includes a power control circuit 60. The power control circuit 60 can be configured to set the initial transmit power offset used for transmitting on a secondary reverse link carrier from the mobile station 12 as a function of initialization power offset information received by the mobile station 12. As noted, the information may comprise one or more pre-computed offset values that relate one or more candidate secondary reverse link carriers to a primary reverse link carrier currently in use at the mobile station 12. Alternatively, the information may comprise reverse link loading information and/or active set size and sector switching information that can be used by the power control circuit 60 to compute the appropriate offsets.

In either case, the mobile station 12 broadly comprises the transceiver circuit 44, which is configured to receive initialization power offset information from a supporting wireless communication network, and one or more processing circuits—e.g., the power control circuit 60—configured to set an initial transmit power of a secondary reverse link carrier relative to a primary reverse link carrier as a function of the initialization power offset information. As noted, the initialization power offset information may comprise reverse link loading information associated with the primary and secondary reverse link carriers, such that the mobile station 12 considers reverse link loading differences relating a secondary reverse link carrier to a primary reverse link carrier, when determining the initial transmit power offset to be used for the secondary reverse link carrier relative to a current transmit power of the primary reverse link carrier. That is, the mobile station 12 can be broadly configured to compute an initial power offset for a secondary reverse link carrier relative to a current transmit power of the primary reverse link carrier as a function of the reverse link loading information.

Figure 6:
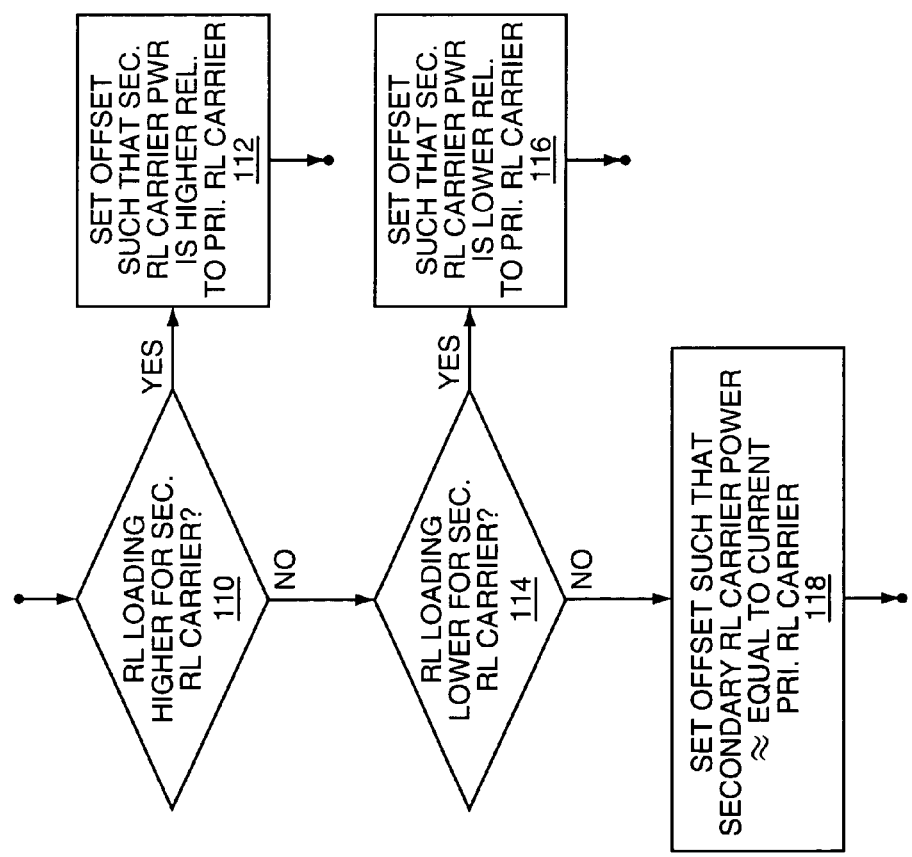
FIG. 6 is a logic flow diagram of one embodiment of mobile station processing logic for setting the initial transmit power of a reverse link secondary carrier.

FIG. 6 illustrates one embodiment of processing logic for initializing the transmit power of a secondary reverse link carrier as a function of reverse link loading. More particularly, the illustrated processing logic determines the power offset to be used for initializing the secondary reverse link carrier transmit power relative to the transmit power of a primary reverse link carrier. Such processing can be performed in the base station controller 18 and/or in the mobile station 12.

Processing begins with determining whether reverse link (RL) loading is higher for a candidate secondary reverse link carrier than for the mobile station's primary reverse link carrier (Step 100). If so, the transmit power offset is set, directly or indirectly, such that the initial transmit power used for transmissions on the secondary reverse link carrier will be higher than the primary reverse link carrier (Step 112).

Conversely, if the relative reverse link loading is lower (Step 114), processing continues with setting the transmit power offset, directly or indirectly, such that the initial transmit power used for transmissions on the secondary reverse link carrier will be lower than the primary reverse link carrier (Step 116). If the relative reverse link loading is the same, or approximately the same, processing continues with setting the transmit power offset, directly or indirectly, such that the initial transmit power used for transmissions on the secondary reverse link carrier will be the same, or approximately the same, as that used for the primary reverse link carrier.

In the above processing context, it will be understood that "higher" and "lower" comparisons may be based on comparing specific values, or may be based on range or threshold comparisons. For example, if the reverse link loading estimates associated with a secondary reverse link carrier of interest and a primary reverse link carrier are within 5% of each other, for example, they may be considered the same and the initial power offset can be set accordingly, e.g., to a zero offset. If the reverse link loading is higher for the secondary reverse link carrier by more than 5%, the initial power offset can be set to a positive non-zero offset relative to the primary reverse link carrier transmit power. Conversely, if the reverse link loading is lower for the secondary reverse link carrier by more than 5%, the initial power offset can be set to a negative non-zero offset relative to the primary reverse link carrier transmit power.

Further, in the above context, directly setting the initial power offset may comprise performing the reverse link loading and/or other comparisons relating the primary and secondary reverse link carriers within the base station controller 18, and transmitting explicit power offset information to the mobile station 12. Conversely, indirectly setting the initial power offset may comprise sending comparison results, or the underlying values for comparison, to the mobile station 12, such that the mobile station 12 computes the initial power offset. In either case, the information may be transmitted to the mobile station 12 via traffic channel assignment messaging.

In another embodiment of implicitly providing initial power offset information to the mobile station 12, RABs or other reverse link load indicators are transmitted by the network 10 in one or more radio sectors. The load indicators may be configured to indicate sector loading without regard to a particular carrier, or may be configured to indicate loading for the available carriers in each sector.

Figure 7:
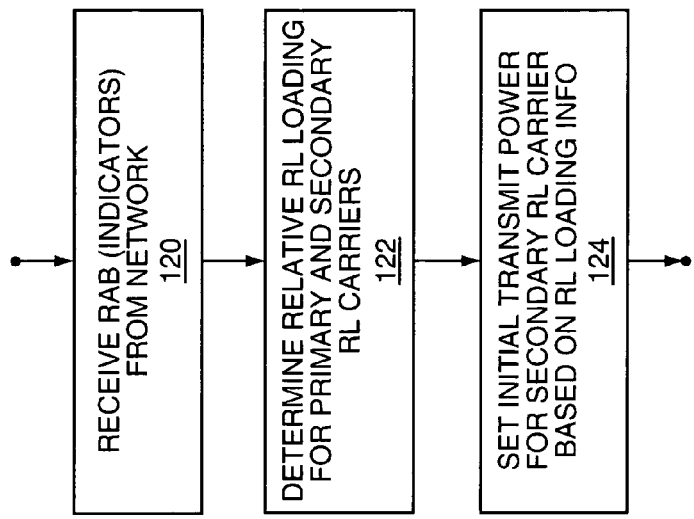
FIG. 7 is a logic flow diagram of another embodiment of mobile station processing logic for setting the initial transmit power of a reverse link secondary carrier.

In any case, the mobile station 12 can be configured to use the transmitted load indicators according to, for example, the processing logic of FIG. 7. The illustrated processing includes the mobile station 12 receiving RABs or other reverse link load indicators from the network 10 (Step 120). Processing continues with the mobile station 12 using the received indicators, which may be periodically or continually updated by the network 10 to reflect changing conditions, to determine relative reverse link loading for a primary reverse link carrier and one or more secondary reverse link carriers of interest (Step 122). Processing continues with the mobile station 12 setting the initial transmit power for a selected secondary reverse link carrier based on the reverse link loading information (Step 124). For example, the mobile station 12 may offset the initial transmit power of the secondary reverse link carrier above the current transmit power of the primary reverse link carrier if the secondary reverse link carrier is associated with a heavier reverse link load than the primary reverse link carrier.

Of course, the present invention is not limited to such embodiments and, indeed, is not limited by the foregoing discussion, or by the accompanying drawings. Rather, the present invention is limited only by the following claims and their legal equivalents.

What is claimed is:

1. A method of initializing reverse link transmit power for secondary reverse link carriers in a wireless communication network, the method comprising:
   determining initialization power offset information for one or more secondary reverse link carriers relative to a primary reverse link carrier as a function of reverse link loading; and
   transmitting the initialization power offset information to a mobile station for use in initializing secondary reverse link carrier transmit power.

2. The method of claim 1, wherein determining the initialization power offset information comprises determining reverse link loading differences relating at least one secondary reverse link carrier to a primary reverse link carrier associated with the mobile station.

3. The method of claim 1, wherein determining the initialization power offset information comprises determining at least one of reverse link loading differences relating one or more secondary reverse link carriers to a primary reverse link carrier, determining active set differences relating one or more secondary reverse link carriers to a primary reverse link carrier, and sector switching activity involving the mobile station.

4. The method of claim 1, wherein the initialization power offset information comprises explicit power offset information identifying at least one power offset to be used for initializing secondary reverse link transmit power relative to a current transmit power of a primary reverse link carrier associated with the mobile station.

5. The method of claim 1, wherein the initialization power offset information comprises implicit power offset information indicating relative reverse link loading information for one or more secondary reverse link carriers and a primary reverse link carrier associated with the mobile station, such that the mobile station computes an initial power offset to be used for a secondary reverse link carrier as a function of the reverse link loading information.

6. The method of claim 1, comprising further determining the initialization power offset information as a function of differences in active set sizes associated with one or more secondary reverse link carriers and a primary reverse link carrier associated with the mobile station.

7. The method of claim 1, wherein determining initialization power offset information for one or more secondary reverse link carriers as a function of reverse link loading comprises determining per-sector offset information, such that the mobile station initializes secondary reverse link carrier transmit power as a function of the per-sector offset information relative to the mobile station's serving sector.

8. The method of claim 1, wherein transmitting the initialization power offset information comprises transmitting the power offset information in a traffic channel assignment message.

9. The method of claim 1, wherein transmitting the initialization power offset information comprises transmitting the power offset information in a broadcast or unicast message.

10. A base station controller comprising one or more processing circuits configured to:
determine initialization power offset information for one or more secondary reverse link carriers relative to a primary reverse link carrier as a function of reverse link loading; and
transmit the initialization power offset information to a mobile station for use in initializing secondary reverse link carrier transmit power.

11. The base station controller of claim 10, wherein the base station controller is configured to determine the initialization power offset information by determining reverse link loading differences relating at least one secondary reverse link carrier to a primary reverse link carrier associated with the mobile station.

12. The base station controller of claim 10, wherein the base station controller is configured to determine the initialization power offset information by determining at least one of reverse link loading differences relating one or more secondary reverse link carriers to a primary reverse link carrier, determining active set differences relating one or more secondary reverse link carriers to a primary reverse link carrier, and sector switching activity involving the mobile station.

13. The base station controller of claim 10, wherein the initialization power offset information comprises explicit power offset information identifying at least one power offset to be used for initializing secondary reverse link transmit power relative to a current transmit power of a primary reverse link carrier associated with the mobile station.

14. The base station controller of claim 10, wherein the initialization power offset information comprises implicit power offset information indicating relative reverse link loading information for one or more secondary reverse link carriers and a primary reverse link carrier associated with the mobile station, such that the mobile station computes an initial power offset to be used for a secondary reverse link carrier as a function of the reverse link loading information.

15. The base station controller of claim 10, wherein the base station controller is configured to further determine the initialization power offset information as a function of differences in active set sizes associated with one or more secondary reverse link carriers and a primary reverse link carrier associated with the mobile station.

16. The base station controller of claim 10, wherein the base station controller is configured to determine the initialization power offset information by determining per-sector offset information, such that the mobile station initializes secondary reverse link carrier transmit power as a function of the per-sector offset information relative to the mobile station's serving sector.

17. The base station controller of claim 10, wherein the base station controller is configured to transmit the initialization power offset information by transmitting the power offset information in a traffic channel assignment message.

18. A mobile station comprising:
a transceiver circuit configured to receive initialization power offset information from a supporting wireless communication network; and
one or more processing circuits configured to set an initial transmit power of a secondary reverse link carrier relative to a primary reverse link carrier as a function of the initialization power offset information.

19. The mobile station of claim 18, wherein the initialization power offset information comprises reverse link loading information associated with the primary and secondary reverse link carriers.

20. The mobile station of claim 18, wherein the mobile station is configured to compute an initial power offset for a secondary reverse link carrier relative to a current transmit power of the primary reverse link carrier as a function of the reverse link loading information.

21. The mobile station of claim 18, wherein the mobile station is configured to compute the initial transmit power offset such that the initial transmit power used for a secondary reverse link carrier is higher than a current transmit power of the primary reverse link carrier if the secondary reverse link carrier is more heavily loaded than the primary reverse link carrier, and is configured to compute the initial transmit power offset such that the initial transmit power used for a secondary reverse link carrier is lower than a current transmit power of the primary reverse link carrier if the secondary reverse link carrier is more lightly loaded than the primary reverse link carrier.

22. The mobile station of claim 18, wherein the initialization power offset information comprises per-sector offset information, and wherein the one or more processing circuits are configured to update the initial transmit power if the mobile station changes serving sectors before inner loop power control of the secondary reverse link carrier begins.

23. A mobile station method comprising:
receiving initialization power offset information from a supporting wireless communication network; and
setting an initial transmit power of a secondary reverse link carrier relative to a primary reverse link carrier as a function of the initialization power offset information.

24. The method of claim 23, wherein the initialization power offset information comprises reverse link loading information associated with the primary and secondary reverse link carriers.

25. The method of claim 23, wherein setting the initial transmit power of the secondary reverse link carrier comprises computing an initial power offset for a secondary reverse link carrier relative to a current transmit power of the primary reverse link carrier as a function of the reverse link loading information.

26. The method of claim 23, wherein receiving the initialization power offset information comprises receiving per-sector offset information, and wherein the method further comprises updating the initial transmit power to reflect a changed serving sector if the mobile station changes serving sectors before inner loop power control of the secondary reverse link carrier by the network has begun.

27. A mobile station comprising:
a transceiver circuit configured to receive reverse link loading information; and
one or more processing circuits configured to set an initial transmit power of a secondary reverse link carrier relative to a primary reverse link carrier as a function of the reverse link loading information.

28. The mobile station of claim 27, wherein the reverse link loading information indicates reverse link loading differences relating the primary reverse link carrier to one or more secondary reverse link carriers that are candidates for use by the mobile station.

* * * * *